S. MOHLER.
CORN HARVESTER.
APPLICATION FILED JAN. 24, 1908.

914,494.

Patented Mar. 9, 1909.

Witnesses:
J. L. Clarke
Alfred Van Dorn

Inventor
Samuel Mohler,
By J. M. St. John.
Atty.

UNITED STATES PATENT OFFICE.

SAMUEL MOHLER, OF CEDAR RAPIDS, IOWA.

CORN-HARVESTER.

No. 914,494.  Specification of Letters Patent.  Patented March 9, 1909.

Application filed January 24, 1908. Serial No. 412,524.

*To all whom it may concern:*

Be it known that I, SAMUEL MOHLER, a citizen of the United States, residing at Cedar Rapids, in the county of Linn and State of Iowa, have invented certain new and useful Improvements in Corn-Harvesters; and I do hereby declare the following to be a full, clear, and exact description of the invention, such as will enable others skilled in the art to which it appertains to make and use the same.

This invention relates to corn harvesters having a pair of forwardly extending gathering arms with cutting blades thereon, and a vibrating sickle to cut off such stalks as are left by the first named cutting blades.

The object of this invention is to so modify the construction and arrangement of the cutters as to enable them to sever the stalks by diagonal cuts, and thus greatly reduce the power required in cutting.

The nature of the invention is fully disclosed in the description and claims following, reference being had to the accompanying drawings, in which—

Figure 1:
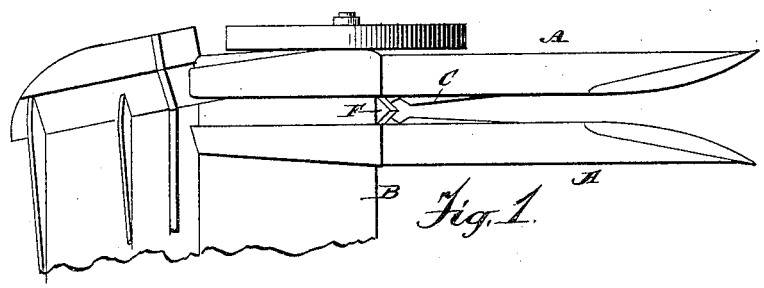
Figure 2:
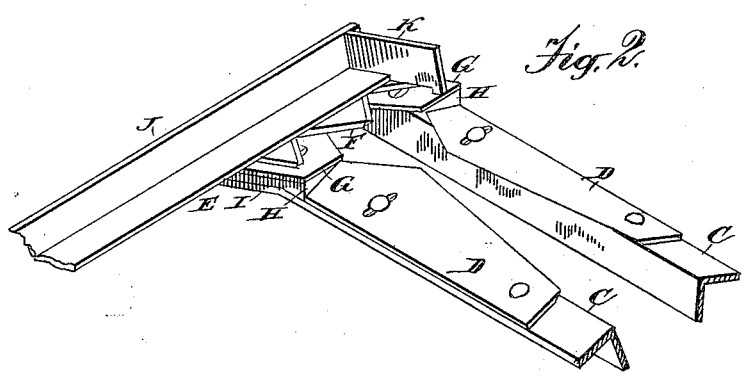
Figure 3:
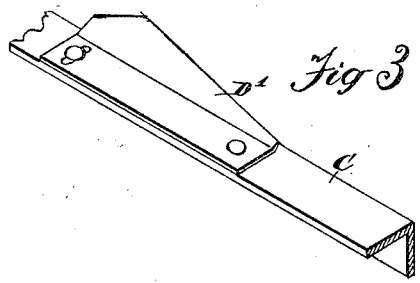

Figure 1 is a plan view illustrating the cutting apparatus of a corn harvester (but not the driving mechanism). Fig. 2 is a view in perspective illustrating my peculiar arrangement of cutters. Fig. 3 shows a modification in the construction of the stationary cutters.

The invention is essentially simple, and is intended to utilize practically in the cutting of corn the familiar fact that it is much easier to cut off a corn-stalk, or a stick of wood, by forcing the knife through it diagonally, than by cutting it square across. The means by which this elementary principle is practically applied will now be described.

In the drawing, A A designate the gathering arms of a corn harvester of a familiar type, connecting with the body of the machine B, which need not be particularly described, as it forms no essential feature of this invention. These gatherers, as is well known, incline downwardly from near the body of the machine to near the ground, at the front ends, which are about at the cutting level. Here they unite with cutter-bars C C extending back horizontally to the body of the machine. It is the general practice to mount on these cutter-bars a pair of inwardly projecting knives, horizontal both endwise and cross-wise, and with cutting edges converging backwardly. Back of these, and lying in a horizontal plane, is commonly mounted a vibrating cutter, in the nature of a mower sickle, to sever such stalks as are not completely cut off by the stationary knives. To cut the stalks square off in this way is so difficult that at least four heavy horses are needed to operate the harvester efficiently.

Referring now to the drawing, it will be seen that in my improved construction the stationary knives are tilted at an angle to the horizontal, preferably with the cutting edges inclined upwardly, so that as the knife passes through the corn-stalks it takes them diagonally, and in a way to sever and lift them away from the butts in the easiest possible manner. This arrangement of the knives may be effected in a variety of ways. Thus in Fig. 2 flat knives D D are secured to twisted or inclined cutter-bars, while in Fig. 3 a bent cutter $D^1$ is shown attached to a horizontal cutter-bar. The former is perhaps preferable, but the latter would make the improvement applicable to the cutter-bars now in general use. Back of these stationary knives is mounted a sickle-bar E (supposed to be driven back and forth by suitable mechanism not shown). This is provided with one or more sections F of the usual type, coacting with ledger-plates G to give the desired shearing cut. It will be seen that both the sickle and the ledger-plates are inclined backwardly and downwardly with respect to the cutters forward of them, and for the same purpose, as already described. To give the desired inclination the cutter-bars (angle-bars) may be provided with wedge-shaped space-blocks H, a part of the angle-bar flange I being bent, as shown. In practice the front angle of the sickle section should be at about the same level as the highest point of the stationary cutter ahead of it, so that the sickle begins to cut where the stationary cutters leave off cutting. No pains have been taken to illustrate in detail the mounting of the sickle-bar further than to show an angle-bar J and a guide-plate K at one end, it being presumed, of course, that two or more guides should be provided for the sickle-bar.

It will be evident that instead of tilting the angle-bars to which the stationary cutters are detached, or bending the cutters themselves, as already described, the desired inclination of the cutters might be secured by the use of wedge-blocks, in a manner similar to that shown in connection with the ledger-plates.

Having thus described my invention, I claim:

In a corn-harvester, the combination of stationary cutters, converging backwardly and inclined upwardly and inwardly at their cutting edges, and a sickle mounted behind them, and inclined upwardly and forwardly, substantially as and for the purpose set forth.

In testimony whereof I affix my signature in presence of two witnesses.

SAMUEL MOHLER.

Witnesses:
J. J. CLEMENTS,
J. M. ST. JOHN.